(12) United States Patent
Arvapally et al.

(10) Patent No.: US 12,395,947 B2
(45) Date of Patent: Aug. 19, 2025

(54) SYSTEM AND METHOD TO CONFIGURE O-RAN FRONTHAUL TO SUPPORT 2ND-GENERATION (2G), 3RD-GENERATION (3G) AND NB-IOT

(71) Applicant: Mavenir Systems, Inc., Richardson, TX (US)

(72) Inventors: RadhaKrishna Arvapally, Bangalore (IN); Atanu Guchhait, Bangalore (IN); Somashekar Mudaraddi, Bangalore (IN); Brijesh Unnikrishnan, Bangalore (IN); Wessam Afifi Ahmed, Plano, TX (US); Neil Philip Piercy, Royston (GB)

(73) Assignee: MAVENIR SYSTEMS, INC., Richardson, TX (US)

( * ) Notice: Subject to any disclaimer, the term of this patent is extended or adjusted under 35 U.S.C. 154(b) by 428 days.

(21) Appl. No.: 17/848,772

(22) Filed: Jun. 24, 2022

(65) Prior Publication Data
US 2023/0052205 A1 Feb. 16, 2023

(30) Foreign Application Priority Data
Jun. 24, 2021 (IN) .............................. 202121028461

(51) Int. Cl.
*H04W 52/52* (2009.01)
*H04W 72/0446* (2023.01)
*H04W 74/08* (2009.01)
*H04W 74/0833* (2024.01)

(52) U.S. Cl.
CPC ....... *H04W 52/52* (2013.01); *H04W 72/0446* (2013.01); *H04W 74/0833* (2013.01); *H04W 74/0866* (2013.01)

(58) Field of Classification Search
CPC ............. H04W 52/52; H04W 72/0446; H04W 74/0833; H04W 74/0866
See application file for complete search history.

(56) References Cited

U.S. PATENT DOCUMENTS

| 10,791,507 | B1 * | 9/2020 | Mukherjee | ............ H04W 4/029 |
| 2020/0128414 | A1 | 4/2020 | Mishra et al. | |
| 2021/0045193 | A1 | 2/2021 | Mishra et al. | |
| 2021/0126760 | A1 * | 4/2021 | Lee | ...................... H04B 7/0617 |
| 2024/0259084 | A1 * | 8/2024 | Astrom | ................ H04B 7/0697 |
| 2024/0292344 | A1 * | 8/2024 | Guo | .................... H04W 52/367 |

FOREIGN PATENT DOCUMENTS

WO 2019217391 A1 11/2019

OTHER PUBLICATIONS

O-RAN Alliance Working Group 4 CUS.0-v06.00 "Control Use and Synchronization Plane Specification" O-Ran Alliance, Mar. 11, 2021.
O-RAN Alliance Working Group 4 MP.0-v06.00 "Management Plane Specification" O-Ran Alliance, Mar. 22, 2021.
(Continued)

*Primary Examiner* — Wayne H Cai
(74) *Attorney, Agent, or Firm* — Ruggiero McAllister & McMahon LLC

(57) ABSTRACT

There is provided, an open radio access network distributed unit (O-DU) having an electronic module that performs an FS-8 Radio Access Technology (RAT) functionality.

14 Claims, 3 Drawing Sheets

(56) References Cited

OTHER PUBLICATIONS

O-RAN Fronthaul Working Group 4 CUS.0-v02.00 "Control Use and Synchronization Plane Specification" O-Ran Alliance, Aug. 2, 2019.

Umesh et al. "Overview of O-RAN Fronthaul Specifications (Special Articles on Standardization Trends Toward Open en Intelligent Radio Access Networks)" NTT Docomo Technical Journal, vol. 21, No. 1, Apr. 1, 2019 pp. 46-59.

Extended European Search Report and Written Opinion for corresponding European application EP22181111.0, 10 pages, dated Nov. 28, 2022.

* cited by examiner $T_{subfr} = 1ms$

| #0 | #1 | #2 | #3 | #4 | #5 | #6 | #7 | #8 | #9 | #10 | #11 | #12 | #13 |

0 or #7

1

Symbol Size: No of IQ samples $T_{symb} = 71.9\mu s$ at sample rate corresponding to the system bandwidth e.g., Symbol Size = 1104 Samples for 10MHz bandwidth multicarrier 2G/3G System Symbol Size: No of IQ samples $T_{symb} = 71.3\mu s$ at sample rate corresponding to the system bandwidth e.g., Symbol Size = 1096 samples for 10MHz bandwidth multicarrier 2G/3G System

FIG. 2

$T_{subfr} = 1 ms$

| #0 | #1 | #2 | #3 | #4 | #5 | #6 | #7 | #8 | #9 | #10 | #11 | #12 | #13 | #14 | k

*All 15 symbols are equal sized*
*- Symbol Size: No of IQ samples $T_{symb} = 66.67 \mu s$ at sample rate corresponding to the system bandwidth*
*- E.g., Symbol Size = 1024 IQ samples for 10MHz bandwidth multicarrier 2G/3G System*

FIG. 3

SYSTEM AND METHOD TO CONFIGURE O-RAN FRONTHAUL TO SUPPORT 2ND-GENERATION (2G), 3RD-GENERATION (3G) AND NB-IOT

CROSS REFERENCE TO RELATED APPLICATIONS

This application claims foreign priority to Indian Patent Application No. 202121028461, filed on Jun. 24, 2021, the entirety of which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

1. Field of the Disclosure

The present document is directed to a system for functional split-8 (FS-8) Radio Access Technologies (RATs), referred to herein as FS-8 RAT, e.g., second generation (2G) and third generation (3G), to generate/receive Open Radio Access Network (O-RAN) fronthaul (FH) compatible messaging in an open distributed unit (O-DU). The acronyms O-DU and DU are used herein, interchangeably. For references to an Open RAN Radio Unit, the acronyms O-RU and RU are used herein, interchangeably. In embodiments, described are:
  Multi-RAT DUs supporting 2G, 3G, 4G and 5G along with NB-IOT
  vDUs supporting 2G and/or 3G along with NB-IOT
  Multi-RAT RUs supporting 2G, 3G, 4G and 5G along with NB-IOT
  RUs supporting 2G and/or 3G along with NB-IOT
  O-RAN compliant distributed units (O-DUs) and O-RAN compliant radio units (O-RUs).
  O-RAN compliant combined central unit (O-CU) and O-DU communicating via the O-RAN fronthaul interface to O-RUs.
  O-RAN compliant Service Management and Orchestration (SMO) communicating to O-CUs, O-DUs and O-RUs.
The invention also supports any existing/future wireless system that is O-RAN compliant.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

The present document, near its end, includes a list of acronyms and a list of definitions.

Open Radio Access Network (O-RAN) standard has gained huge attention from wireless infrastructure manufacturers and operators across the globe. O-RAN fronthaul (FH) specification allows interoperability and standardization of RAN components primarily Open Distributed Unit (O-DU) and Open Radio Unit (O-RU) using a unified interconnection standard over a packet-based transport interface such as Enhanced Common Public Radio Interface (eCPRI) and Radio over Ethernet (RoE). This has enabled seamless integration of white-box hardware and open-source software elements from different component vendors for O-DUs and O-RUs.

O-RAN standard in its current specifications covers support for the control, user, and synchronization planes (CUS-plane) (O-RAN Control, User and Synchronization Plane Specification 6.01, O-RAN.WG4.CUS.0-v06) and management plane (M-plane) (O-RAN Management Plane Specification v06, O-RAN.WG4.MP.0-v06.) for only radio access technologies (RAT). As of the present disclosure, the O-RAN standard supports only 4G and 5G radio access technologies (RAT) through functional split 7.2x (FS-7.2x) interconnect where frequency domain data IQ samples, beamforming weights and related control, management and synchronization information are carried over a fronthaul interface (FH). This architecture allowed FS-7.2x RAT base-station systems to be designed and deployed more flexibly, cost effectively and efficiently, thus reducing system CAPEX and OPEX significantly.

Accordingly, in the current O-RAN specification, packet-based FH interface standard O-RAN supports only FS-7.2x RAT operations, thus defines frequency-domain IQ data transfer mechanism over FH using O-RAN specified CUS and M-plane standards. 2G and 3G radio access technologies traditionally use streaming interface-based FH connections to carry time-domain IQ samples to or from the RU. The O-RAN standard in its current form, however, does not support RATs with functional split-8 (FS-8), which do not have any frequency-domain operations defined in their respective RAT standard specifications. As such, the O-RAN standard in its current form does not provide any support to carry FS-8 RAT time domain IQ data, control, and related management information over the FH interface. Enhancements in multiple aspects are needed in O-RAN standard for seamless integration of 2G and 3G RATs supporting functional split FS-8 with newer RATs (4G and NR) supporting FS-7.2x.

SUMMARY OF THE DISCLOSURE

Described are implementations of O-RAN FH interfaces to FS-8 RATs to carry time domain IQ samples over the FH without impacting the existing access network operations.

In implementations, described are a set of additions to the current O-RAN standard from the M-Plane perspective to enable FS-8 RATs transport over the FH.

Implementations described herein do not change with hybrid and hierarchical M-Plane architectures as they do not impact existing M-Plane procedures. The disclosed parameters can be transported as part of existing user plane configuration as defined in the standard for hybrid and hierarchical models.

Existing O-RAN fronthaul interfaces do not support transport of FS-8 RAT traffic. Thus FS-8 RATs were transported to/from RU using non-O-RAN FH standards like CPRI or eCPRI.

In an implementation, disclosed is an open radio access network distributed unit (O-DU) comprising an electronic module that configured with structures to execute parameters to perform FS-8 Radio Access Technology (RAT), the parameters comprising:
  FS-8 frame structure parameters;

Narrow Band-Internet of Things (NB-IOT) parameters; and automatic gain control (AGC) parameters.

In an implementation, the O-DU can be further configured to send AGC parameters for a random access channel (RACH) AGC configuration to a 2G network radio unit (O-RU), the AGC parameters comprising: a Frame number where the RACH is expected; a Slot Number or Slot Numbers on the corresponding Frame number; and a Target dynamic Gain Range of the AGC. The 2G radio unit can determine one or more of the AGC parameters based on the AGC parameter values. The 2G O-RU can be configured to determine where the RACH is expected on a frame and apply gain control based on the AGC parameter values.

In an implementation, the FS-8 frame structure can comprise a maximum symbol size per millisecond capability for the O-RU. The FS-8 frame structure can further comprises extended symbol length parameter, a normal symbol length parameter, a sampling rate parameter, or a combination thereof. The FS-8 frame structure can further comprise an AGC-2G parameter, a 2G/3G RU frame format parameter, or both. The sampling rate $SR_{bandwidth}$ (in Msps) for occupied bandwidth can be used to determine a symbol length $N_{symb}$ and a cyclic prefix length $CP_{bandwidth}$ of fronthaul symbols. The FH symbols can be expressed as:

$$N_{symb} = T_{symb} \times SR_{bandwidth}$$

$$CP_{bandwidth} = (T_{symb} - 66.66 * e^6) \times SR_{bandwidth}$$

where $T_{symb}$ is in seconds.

In an implementation, the AGC parameters can comprise a parameter structure configured for the O-DU to inform an O-RU of AGC parameters other than RACH slots, the parameters comprising: a target dynamic range of the AGC, and AGC parameter sets. The AGC parameter sets can comprise an AGC integral gain parameter, an AGC proportional gain parameter, and a derivative gain parameter.

In an implementation, the O-DU can be configured to support a 2G and 3G NB-IOT. The O-DU can be configured with a supported technology parameter configured for supporting GSM, UMTS and an NB-IOT, the supported technology parameter comprising a downlink parameter set, and uplink parameter set, or both. The O-DU can be configured to support 2G and 3G NB-IOT in a U-plane configuration, wherein the O-DU is configured with carrier parameters. The carrier parameters can comprise: tx-array carrier parameters, rx array carrier parameters, or both.

BRIEF DESCRIPTION OF THE DRAWINGS

FIG. 2 shows a 4G LTE subframe and slot structure.

FIG. 3 shows a 4G LTE subframe and slot structure.

DESCRIPTION OF THE DISCLOSURE

Figure 1:
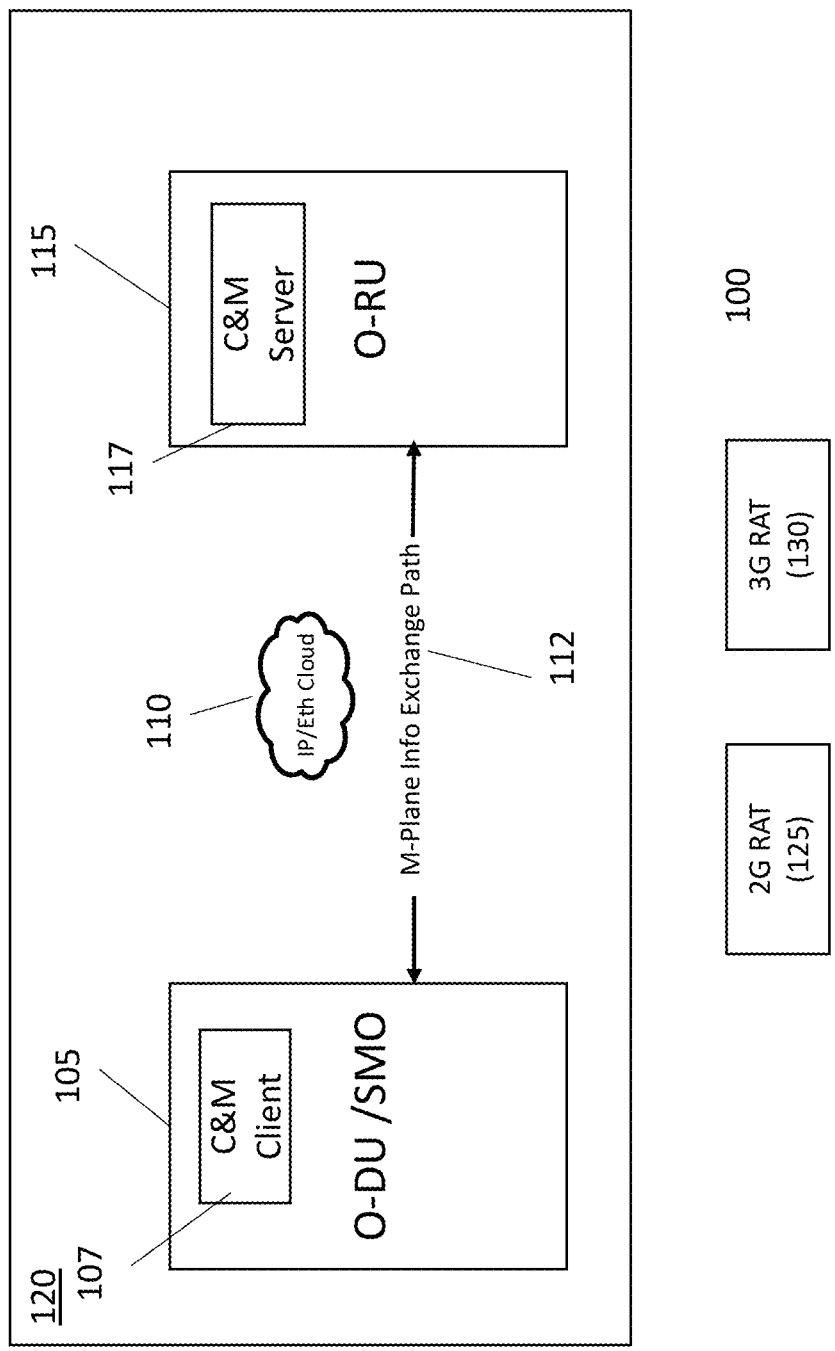
FIG. 1 is a block diagram of a system of a single RAT radio access solution where an O-DU communicates with an O-RU over an O-RAN FH in an O-RAN.

The system disclosed herein will allow FS-8 RATs (2G and 3G) to interface to O-RAN FH, and in general, any packet-based FH transport network standard. Reference is made to Third Generation Partnership Project (3GPP), the O-RAN Alliance, and the Internet Engineering Task Force (IETF) in accordance with embodiments of the present disclosure FIG. 1 is a block diagram of a system 100 of a single RAT radio access solution where an O-DU 105 communicates with an O-RU 115 over an O-RAN FH 110 in an O-RAN 120. System 100 includes a 2G RAT 125 and a 3G RAT 130, which, in practice, are connected directly to O-DU 105.

System 100 can be configured for single carrier or multi-carrier systems. For example, for multi-carrier systems, the system can be configured to map the 2G signal to the any LTE bandwidth equivalent analog stream such as 5/10/15/20 MHz. Thus, system 100 allows an available 2G spectrum to be split across different antennas in multiples of LTE-equivalent bandwidths by using different RF frequencies for each of the antenna.

Implementations as described in this section with respect to a RAT system diagram in FIG. 1 where, O-RU system implement the C&M server 117. O-RU declares its capability and works with the C&M client 107 located in O-DU 105. M-Plane standard based message/information exchange 112 are carried out between O-RU and O-DU (between C&M server 117 and C&M client 105) over the FH 110 to handshake required non-real time system configuration and management for desired system operation.

Each of O-DU 105 and O-RU 115 includes electronic circuitry that performs operations to execute methods or processes described herein. The circuitry may be implemented with any or all of (a) discrete electronic components, (b) firmware, or (c) a programmable circuit that includes a processor and a memory. Such a processor is an electronic device configured of logic circuitry that responds to and executes instructions. Such a memory is a tangible, non-transitory, computer-readable storage device encoded with a computer program. In this regard, the memory stores data and instructions, i.e., program code, that are readable and executable by the processor for controlling operations of the processor. The memory may be implemented in a random-access memory (RAM), a hard drive, a read only memory (ROM), or a combination thereof.

Additionally, the program code may be configured on a storage device for subsequent loading into the memory. Such a storage device is a tangible, non-transitory, computer-readable storage device, and examples include (a) a compact disk, (b) a magnetic tape, (c) a read only memory, (d) an optical storage medium, (e) a hard drive, (f) a memory unit consisting of multiple parallel hard drives, (g) a universal serial bus (USB) flash drive, (h) a random-access memory, and (i) an electronic storage device coupled the components of system 100 via a network, e.g., the Internet.

The program code may be configured in one or more modules. The term "module" is used herein to denote a functional operation that may be embodied either as a stand-alone component or as an integrated configuration of a plurality of subordinate components. Thus, a module may be implemented as a single module or as a plurality of sub-ordinate modules that operate in cooperation with one another.

In an implementation, described is an O-RAN M-Plane Data-Structure Enhancement for 2G, 3G, NB-IoT RAT:

In an implementation, described is a YANG parameter structure for a DU to inform an RU of AGC parameters for a RACH Slot. AGC is a conditional feature, which can be implemented as a function of whether the O-RU supports 2G or not. The parameter is applicable for single carrier 2G or synchronized multi carrier 2G systems.

In an implementation, a 2G O-DU 107 sends following parameters to 2G O-RU for RACH AGC configuration:

a Frame number where a RACH is expected;
a Slot Number(s) on the corresponding Frame number;
a Target dynamic Gain Range of the AGC; and AGC parameter sets (e.g.: agc-rach-nframe, agc-rach-slot, agc-rach-proportional-gain, agc-rach-integral-gain and agc-rach-differential-gainfactors). An implementation of an exemplary 2G PARCH AGC optional parameter structure includes:

```
+--rw agc-configuration--rach {AGC-2G}
+--agc-rach-nframe? unit 8
   +--agc-rach-rach-slot? unit 8
   +--agc-rach-proportional-gain? decimal64
   +--agc-rach-integral-gain? decimal64
   +--agc-rach-differential-gain? decimal64
+--rw agc-configuration--tch {AGC-2G}
+--agc-tch-gain-range? decimal64
   +--agc-tch-integral-gain? decimal64
   +--agc-tch-differential-gain? decimal64
   +--agc-tch-proportional-gain? decimal64
=
```

The 2G PARCH AGC optional parameter structure can be implemented under the O-RAR U-Plane configuration for rx array carriers (o-ran-uplane-conf.yang→rx-array-carriers).

Based on the parameter values, a 2G RU can be configured to determine the slots where the RACH is expected on each frame and can thus apply gain control.

In an implementation, described is a subframe and slot structure supporting multiple symbols in a frame. Over the FH multicarrier 2G and 3G radio access technology, IQ data flows can have following two alternative frame structures.

Option 1: Maintain 4G LTE subframe and slot structures and the corresponding 14 symbols per subframe as shown in the FIG. 2. Differences with 4G are total number of IQ data sample content per symbol is equal to the full size of the corresponding LTE symbol size for the corresponding bandwidth of operation. For example, for slot #0 or #7, a Symbol Size is the number of IQ samples Tsymb=71.9 µs at a sample rate corresponding to the system bandwidth e.g., Symbol Size=1104 Samples for a 10 MHz bandwidth multicarrier 2G/3G System. For slot #1, a Symbol Size is the number of IQ samples Tsymb=71.3 µs at a sample rate corresponding to the system bandwidth e.g., Symbol Size=1096 Samples for a 10 MHz bandwidth multicarrier 2G/3G System Option 2: Maintain 4G LTE Subframe and slot structure and the corresponding 15 symbols per subframe as shown in FIG. 3. The difference for a 4G system is the number of IQ data sample content per symbol is equal to the full size of the corresponding LTE symbol size for the corresponding bandwidth of operation. For example, all slots have a Symbol Size that is the number of IQ samples Tsymb=66.67 us at a sample rate corresponding to the system bandwidth e.g., Symbol Size=1024 Samples for a 10 MHz bandwidth multicarrier 2G/3G System.

To support the above symbols in one millisecond, the O-RU can be configured to indicate the capability in YANG model under RU capability (e.g.: max-symbols-per-ms).

In an implementation, described is a FH sampling rate and symbol length structure and process. The O-DU can be configured to indicate the fronthaul sampling rate to O-RU. The sampling rate $SR_{bandwidth}$ (in Msps,) which is a function of occupied bandwidth, can be configured to determine the symbol length $N_{symb}$ and cyclic prefix length $CP_{bandwidth}$ of the fronthaul symbols. They could be expressed as following:

$$N_{symb} = T_{symb} \times SR_{bandwidth}$$

$$CP_{bandwidth} = (T_{symb} - 66.66 * e^6) \times SR_{bandwidth}$$

Where $T_{symb}$ is in unit seconds.

An example of an implementation of FS-8 frame format parameters is shown below. Three additional parameters, "extended-symbol-length", "normal-symbol-length" and "sampling-rate", can be added under an O-RAN U-Plane configuration (o-ran-uplane-conf.yang), for example as follows:

```
+--rw fs8-frame-structure {FS8-Frame-Format}?
   +--rw max-symbols-per-ms
   +--rw extended-symbol-length
   +--rw normal-symbol-length
   +--rw sampling-rate
```

These parameters can be pushed from O-DU to O-RU via the M-plane as part of user plane configuration for 2G RUs 125 or 3G RUs 130. Optional features as shown in Table 1 can also be added.

TABLE 1

| No | Optional Feature | Namespace | Feature name |
|---|---|---|---|
| 1 | AGC for 2G RUs | "urn:o-ran:uplane-conf:x.y" | AGC-2G |
| 2 | Frame Format for 2G/3G RUs | "urn:o-ran:uplane-conf:x.y" | FS8-FRAME-FORMAT |

In an implementation, described is a Yang parameter structure for an O-DU to inform an O-RU of AGC parameters for slots other than RACH slots. A 2G O-DU sends following parameters to 2G O-RU for AGC configuration for TCH and other slots: a Target dynamic Gain Range of the AGC and the AGC parameter sets {agc-tch-integral-gain, agc-tch-differential-gain, and agc-tch-proportional-gain} (proportional, integral and derivative parameters).

The 2G TCH slots (except RACH) AGC parameter structures are implemented under and an O-RAN U-Plane configuration for rx array carriers (o-ran-uplane-conf.yang→rx-array-carriers). Based on the above-referenced values, the 2G Radio unit can apply gain control for slots other than RACH slots.

In an implementation, a module is configured for a YANG model to support 2G, 3G and NB-IOT. The O-RU can be configured to report as a part of its capabilities whether it supports 2G, 3G, or NB-IOT. For example, an enhanced definition is added to the following two parameters in YANG model under RU capability:

```
● supportedtechnology-dl
    ○ enum range of type enhanced to support GSM, UMTS,
      NBIoT
  leaf-list supported-technology-dl {
    type enumeration{
      enum LTE {
        description "LTE is supported in DL path.";
      }
      enum NR {
        description "NR is supported in DL path.";
      }
      enum DSS_LTE_NR {
        if-feature DSS_LTE_NR;
        description
           "DSS is supported in the DL, which implicitly means LTE
            and NR are also BOTH supported in the DL.";
      }
      enum GSM {
        description "GSM is supported in DL path.";
      }
      enum UMTS {
        description "UMTS is supported in DL path.";
      }
      enum NBIOT {
        description "NBIOT StandAlone mode supported by RU";
```

```
        }
        enum NBIOT-LTE {
            description "NBIOT inband/guard band mode over LTE carrier
supported by RU";
        }
        enum NBIOT-NR {
            description "NBIOT inband/guard band mode over NR carrier
supported by RU";
        }
    }
}
● supportedtechnology-ul
        ○ enum range of type enhanced to support GSM, UMTS,
          NBIoT
leaf-list supported-technology-ul {
  type enumeration{
    enum LTE {
        description "LTE is supported in UL path.";
    }
    enum NR {
        description "NR is supported in UL path.";
    }
    enum DSS_LTE_NR {
      if-feature DSS_LTE_NR;
      description
        "DSS is supported in the UL, which implicitly means LTE
         and NR are also BOTH supported in the UL.";
    }
    enum GSM {
        description "GSM is supported in UL path.";
    }
    enum UMTS {
        description "UMTS is supported in UL path.";
    }
    enum NBIOT {
        description "NBIOT StandAlone mode supported by RU";
    }
    enum NBIOT-LTE {
        description "NBIOT inband/guard band mode over LTE carrier
supported by RU";
    }
    enum NBIOT-NR {
        description "NBIOT inband/guard band mode over NR carrier
supported by RU";
    }
  }
}
```

In an implementation, to support 2nd-Generation (2G), 3rd-Generation (3G) and NB-IoT in U-plane configurations, enum values for the parameter "type" are added under tx-array-carriers and rx-array-carriers present in the O-RAN U-Plane configuration (o-ran-uplane-conf.yang).

The present disclosure employs abbreviations, terms and technology defined in accord with Third Generation Partnership Project (3GPP) and/or Internet Engineering Task Force (IETF) technology standards and papers, including the following standards and definitions. 3GPP and IETF technical specifications (TS), standards (including proposed standards, technical reports (TR) and other papers are incorporated by reference in their entirety hereby, define the related terms and architecture reference models that follow.

Acronyms

3GPP: 3rd Generation Partnership Project
AGC: Automatic gain control
BS: Base Station
C&M: Control and Management
CAPEX: Capital expenditures
CCH: Control channel
CPRI: Common Public Radio Interface
CUS-plane: Control, user, and synchronization plane
DL: Downlink
eCPRI: Enhanced Common Public Radio Interface
eNB: eNodeB (4G LTE base station)
FEC: Forward error correction
FH: Fronthaul
FS: Functional split
gNB: gNodeB (5G NR base station)
GPS: Global positioning system
HW: Hardware
M-plane: Management plane
NBIoT: Narrow Band Internet of Things
O-CU: O-RAN compliant Centralized Unit
O-DU: O-RAN compliant Distributed Unit
O-RU: O-RAN compliant Radio Unit
OPEX: Operating expenses
PRACH: Physical random access channel
PRB: Physical resource block
PTP: Precision time protocol
RACH: Random access channel
RAT: Radio access technology
RE: Resource element
RoE: Radio over Ethernet
SMO: Service Management and Orchestration
SW: Software
SyncE: Synchronous Ethernet
TCH: Traffic channel
UL: Uplink Definitions Channel: the contiguous frequency range between lower and upper frequency limits.
DL: DownLink: data flow towards the radiating antenna (generally on the LLS interface)
LLS: Lower Layer Split: logical interface between O-DU and O-RU when using a lower layer (intra-PHY based) functional split.
M-Plane: Management Plane: refers to non-real-time management operations between the O-DU and the O-RU.
Node-B: 3GGP defined access function for 3G RAT.
O-CU: O-RAN Control Unit—a logical node hosting PDCP, RRC, SDAP and other control functions
O-DU: O-RAN Distributed Unit: a logical node hosting RLC/MAC/High-PHY layers based on a lower layer functional split.
O-RU: O-RAN Radio Unit: a logical node hosting Low-PHY layer and RF processing based on a lower layer functional split. This is similar to 3GPP's "TRP" or "RRH" but more specific in including the Low-PHY layer (FFT/iFFT, PRACH extraction).
OTA: Over the Air
S-Plane: Synchronization Plane: refers to traffic between the O-RU or O-DU to a synchronization controller which is generally an IEEE 1588 Grand Master (however, Grand Master functionality may be embedded in the O-DU).
U-Plane: User Plane: refers to IQ sample data transferred between O-DU and O-RU
UL: UpLink: data flow away from the radiating antenna (generally on the LLS interface).

```
tx-array-carriers
-- type
       ○ type enhanced to support GSM, UMTS, NBIoT
    leaf type {
       type enumeration {
         enum NR {
```

```
        description
            "5G technology";
    }
    enum LTE {
        description
            "LTE technology";
    }
    enum DSS_LTE_NR {
        if-feature mcap:DSS_LTE_NR;
        description
            "NR and LTE technologies in Dynamic Spectrum
            Sharing mode";
    }
    enum GSM {
        description "GSM technology.";
    }
    enum UMTS {
        description "UMTS technology.";
    }
    enum NBIOT {
        description "NBIOT StandAlone mode
        supported by RU";
    }
    enum NBIOT-LTE {
        description "NBIOT inband/guard band mode over
    LTE carrier supported by RU";
    }
    enum NBIOT-NR {
        description "NBIOT inband/guard band mode over NR
    carrier supported by RU";
    }
}
description
    "Type of carrier. Indicates array-carrier
    technology.";
}
rx-array-carriers
    -- type
    ○ type enhanced to support GSM, UMTS, NBIoT
    leaf type {
        type enumeration {
            enum NR {
                description
                    "5G technology";
            }
            enum LTE {
                description
                    "LTE technology";
            }
            enum DSS_LTE_NR {
                if-feature mcap:DSS_LTE_NR;
                description
                    "NR and LTE technologies in Dynamic Spectrum
                    Sharing mode";
            }
            enum GSM {
                description "GSM technology.";
            }
            enum UMTS {
                description "UMTS technology.";
            }
            enum NBIOT {
                description "NBIOT StandAlone mode supported by RU";
            }
            enum NBIOT-LTE {
                description "NBIOT inband/guard band mode over LTE
        carrier supported by RU";
```
```
            }
            enum NBIOT-NR {
                description "NBIOT inband/guard band mode over NR
                carrier supported by RU";
            }
        }
        description
            "Type of carrier. Indicates array-carrier technology.;
In an implementation, these additional value options are added to
existing values of LTE, NR or DSS-LTE-N.
```

The techniques described herein are exemplary, and should not be construed as implying any particular limitation on the present disclosure. Various alternatives, combinations and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The term "comprises" or "comprising" are to be interpreted as specifying the presence of the stated features, integers, operations or components, but not precluding the presence of one or more other features, integers, operations or components or groups thereof. The terms "a" and "an" are indefinite articles, and as such, do not preclude embodiments having pluralities of articles.

What is claimed is:

1. An open radio access network distributed unit (O-DU) comprising an electronic module that configured with structures to execute parameters to perform FS-8 Radio Access Technology (RAT), the parameters comprising:
    functional split 8 (FS-8) frame structure parameters;
    Narrow Band-Internet of Things (NB-IOT) parameters; and
    automatic gain control (AGC) parameters,
    wherein the O-DU is configured to send the AGC parameters for a random access channel (RACH) AGC configuration to a 2G network radio unit (O-RU), the AGC parameters comprising:
    a Frame number where the RACH is expected;
    a Slot Number or Slot Numbers on the corresponding Frame number; and
    a Target dynamic Gain Range of the AGC.

2. The O-DU of claim 1, wherein the 2G radio unit can determine one or more of the AGC parameters based on the AGC parameter values.

3. The O-DU of claim 2, wherein the 2G O-RU is configured to determine where the RACH is expected on a frame and apply gain control based on the AGC parameter values.

4. The O-DU of claim 1, wherein the FS-8 frame structures comprise a maximum symbol size per millisecond capability for the O-RU.

5. The O-DU of claim 4, wherein the FS-8 frame structure further comprises extended symbol length parameter, a normal symbol length parameter, a sampling rate parameter, or a combination thereof.

6. The O-DU of claim 5, wherein the FS-8 frame structure further comprises an AGC-2G parameter, a 2G/3G RU frame format parameter, or both.

7. The O-DU of claim 1, wherein the O-DU is configured to support a 2G and 3G NB-IOT.

8. The O-DU of claim 7, wherein the O-DU is configured with a supported technology parameter configured for supporting GSM, UMTS and an NB-IOT, the supported technology parameter comprising a downlink parameter set, and uplink parameter set, or both.

9. The O-DU of claim 7, wherein the O-DU is configured to support 2G and 3G NB-IOT in a U-plane configuration, wherein the O-DU is configured with carrier parameters.

10. The O-DU of claim 9, wherein the carrier parameters comprise: tx-array carrier parameters, rx array carrier parameters, or both.

11. An open radio access network distributed unit (O-DU) comprising an electronic module that configured with structures to execute parameters to perform FS-8 Radio Access Technology (RAT), the parameters comprising:
functional split 8 (FS-8) frame structure parameters comprising:
a maximum symbol size per millisecond capability for the O-RU; and
an extended symbol length parameter, a normal symbol length parameter, or a sampling rate parameter, or a combination thereof;
Narrow Band-Internet of Things (NB-IOT) parameters; and
automatic gain control (AGC) parameters,
wherein a sampling rate $SR_{bandwidth}$ (in Msps) for occupied bandwidth is used to determine a symbol length $N_{symb}$ and a cyclic prefix length $CP_{banndiwth}$ of fronthaul symbols.

12. The O-DU of claim 11, where the FH symbols are expressed as:

$$N_{symb} = T_{symb} \times SR_{bandwidth}$$

$$CP_{bandwidth} = (T_{symb} - 66.66 * e^6) \times SR_{bandwidth}$$

where $T_{symb}$ is in seconds.

13. An open radio access network distributed unit (O-DU) comprising an electronic module that configured with structures to execute parameters to perform FS-8 Radio Access Technology (RAT), the parameters comprising:
functional split 8 (FS-8) frame structure parameters;
Narrow Band-Internet of Things (NB-IOT) parameters; and
automatic gain control (AGC) parameters comprising a parameter structure configured for the O-DU to inform an O-RU of AGC parameters other than RACH slots, the AGC parameters comprising: a target dynamic range of the AGC, and AGC parameter sets.

14. The O-DU of claim 13, wherein the AGC parameter sets comprise: an AGC integral gain parameter, an AGC proportional gain parameter and a derivative gain parameter.

* * * * *